Patented Nov. 8, 1949

2,487,466

UNITED STATES PATENT OFFICE 2,487,466

CATALYTIC DESULFURIZATION OF HYDROCARBONS

Paul G. Nahin, Lynwood, Calif., assignor to Union Oil Company of California, Los Angeles, Calif., a corporation of California No Drawing. Application April 9, 1945, Serial No. 587,435

3 Claims. (Cl. 196—24)

This invention relates to catalysts and catalytic processes for processing various hydrocarbons or hydrocarbon mixtures. More particularly the invention relates to a new and improved method of preparing catalysts of the type comprising a base upon which is distended an active catalytic agent.

Catalytic cracking, dehydrogenation, hydrogenation, desulfurization, hydroforming and reforming of hydrocarbons are well known processes. For these processes many catalytic agents have been employed with varying success. Such catalytic agents include the oxides or other compounds of metals such as chromium, molybdenum, cobalt, nickel, zinc, lead, cadmium, vanadium, manganese, tantalum, tungsten, titanium, platinum, columbium, scandium, thorium, uranium, zirconium, tin, copper, etc., which compounds may be produced by an appropriate treatment of the chromates, molybdates, vanadates, sulfates, nitrates, chlorides and other suitable salts of the metals by methods well known in the art. Many of these catalytic agents are effective only when supported on such carriers as alumina, magnesia, magnesium hydroxide, silica, zirconia, titania, zinc oxide, thoria, or any combination of these. The oxides or combinations thereof, of chromium, molybdenum, and cobalt, distended on alumina are the preferred catalysts for the above processes.

For example, in a process generally described as hydroforming a typical commercially prepared catalyst comprising about 9% molybdenum oxide and 91% of alumina is capable of increasing the aromatic content of a naphtha boiling between 200° F. and 280° F. from about 14.3% to about 58% by volume at a temperature of about 950° F., liquid hourly space velocity of 1, a gage pressure of 100 pounds per square inch and with an added 3,000 cubic feet of hydrogen per barrel of feed. Also in a process generally described as dehydrogenation a catalyst composed of about 5% chromium oxide and 95% alumina is capable of effecting a 28% conversion of normal butane to butenes at a temperature of 1050° F. at substantially atmospheric pressure and a gaseous space velocity of from 15 to 17 volumes per volume of catalyst per minute. Similarly in the desulfurization of hydrocarbon stocks a catalyst composed of about 10% of the combined oxides of cobalt and molybdenum and 90% alumina silica carrier is capable of reducing the sulfur content of a pressure distillate boiling in the range of 100° F. to 400° F. from 3.5 weight per cent to about 0.01 weight per cent at a temperature of 700° F., pressure of 300 pounds per square inch gage, liquid hourly space velocity of 1, and with 3,000 cubic feet of added hydrogen per barrel of feed.

Among processes for preparing catalysts of the above types are those of impregnation and coprecipitation. In preparing such a catalyst by impregnation the carrier in the form of powder, granules or pellets is immersed in a solution of a suitable soluble salt of a desired metal such as ammonium molybdate, chromium nitrate, ammonium dichromate, cobalt nitrate, and the like, whereupon the carrier having adsorbed a portion of the solution is dried and calcined at a temperature in the range of about 400° C. to about 700° C. to convert the adsorbed salt to the oxide of the metal or metals employed. In preparing a catalyst by coprecipitation the process embodies a simultaneous precipitation of the hydrated oxide of the carrier and the hydrated oxide or oxides of the desired catalytic agents from a solution containing appropriate amounts of the suitable soluble salts of the carrier type material and the metal or metals employed as catalytic agent. A modification of this procedure consists of precipitating the hydrous oxides of the catalytic agent in the presence of a wet carrier gel.

For example, in preparing a hydroforming catalyst as described above comprising approximately 9% molybdenum and 91% alumina by the method of impregnation the alumina may be immersed in a solution of ammonium molybdate and in turn dried and calcined at a temperature in the range of about 400° C. to about 700° C. to convert the adsorbed ammonia molybdate to molybdenum trioxide. Also in preparing a catalyst of the desulfurization type comprising an alumina carrier and a catalytic agent consisting of the combined oxides of cobalt and molybdenum by the method of coprecipitation, a solution of cobalt nitrate may be added to a solution of aluminum nitrate followed by the addition of a solution of ammonium molybdate containing excess ammonium hydroxide whereby the pH of the combined solution is increased to a value greater than 7 which results in the precipitation of the hydrated oxides of aluminum, cobalt and molybdenum therefrom. The gel is then filtered and washed and subsequently dried and calcined to yield a catalyst comprised of aluminum oxide and the combined oxides of cobalt and molybdenum.

In these catalysts and in the majority of cases the catalyst is comprised of a large percentage as for example from about 60% to about 95% of the carrier material and a comparatively minor percentage of a catalytic agent. The expense of this carrier material is therefore a major factor in the ultimate cost of any catalyst and further than this often eliminates the usage of otherwise desirable compounds as carriers. This is of major importance inasmuch as at the present time the use of these carriers is limited to those materials such as for example alumina, silica, clay, bauxites, and the like, because of their availability in large quantities at comparatively low cost. However, in those catalysts which employ alumina and particularly alumina of high purity and activity the alumina itself contributes a major proportion of the expense to the catalyst. Still more important is the elimination by virtue of the percentage of the carrier material required in such catalysts of the possibility of using a great many materials such as various metal oxides which might prove to be excellent carriers upon which to distend various catalytic agents. A good example of this situation is the fact that zirconium oxide has been found to be an excellent base for catalysts to be employed in certain hydrocarbon conversion processes, but its use is prohibited by the expense of a catalyst employing a major percentage of zirconium oxide. Still further along this line there are many compounds which have not been considered for such usage with any degree of seriousness because of economic reasons.

It is an object of my invention to bring about an advancement in the art of catalyst preparation which will result in a cheaper catalyst for a given reaction than those heretofore employed.

It is another object of my invention to extend the commercially feasible range of materials which may be employed as catalyst carriers by materially reducing the amount of such materials required for an effective catalyst.

A still further object of my invention resides in the use of certain types of spent catalysts to prepare other highly active catalysts.

Other objects and advantages of my invention will occur to those skilled in the art as the description thereof proceeds.

For the purposes of this disclosure catalyst carriers are defined as those materials upon which a catalytic agent is distended to form a completed catalyst and although necessary to any catalyst they do not function as a catalytic agent in themselves. The term "support" is distinguished from the term "carrier" by virtue of the fact that a support may be defined as a physical structure upon which a catalyst is prepared, and although some supporting material is apparently required to give a catalyst the necessary body, it is assumed that as such it has little relation to the functioning of the catalytic agent. Thus every catalyst requires a support, a carrier, and a catalytic agent. In a few cases in regard to petroleum hydrocarbon conversion processes, one component may function as all three of these elements in a catalyst. Catalysts of this nature for example are the aluminum silicate cracking catalysts and cobalt molybdate desulfurization catalysts which in the absence of other components comprise the support, the carrier, and the catalytic agent. In the vast majority of cases, however, one component of the catalyst will function as both the support and the carrier and a second component will function as the catalytic agent. By component is meant one or more compounds which either alone or in combination act to fulfill a particular function in a completed catalyst. Examples of catalysts of this category are the hydroforming and dehydrogenation catalysts as hereinbefore described comprising an alumina base upon which is distended an active catalytic agent; molybdenum oxide, and chromium oxide in these cases, in which the alumina not only functions as a carrier upon which the molybdenum or chromium oxides are distended, but also as a catalyst support furnishing the necessary catalyst structure.

This utilization of a carrier having particular properties essential in the catalyst structure for the proper functioning of the catalytic agent as a support as well as a carrier constitutes a waste of what in many cases is a valuable material. I have found that by substituting a comparatively inert supporting material for a substantial amount of the carrier the amount of carrier can be appreciably reduced without harmful effects on the catalyst. I have accomplished this beneficial effect by distending on a relatively inert material the inactivity of which is predicated on the basis of the particular catalyst prepared and in the particular conversion process in which it is to be employed, a carrier of the type suitable for the particular catalyst to be prepared. The distinction between carrier and support in such cases is sometimes difficult to draw, but in the mass of data compiled on catalytic work in the past years it has been found that certain materials classed as carriers are particularly effective for certain reactions, thus activated alumina is now regarded as a carrier for hydroforming catalysts; whereas clay for example is not so regarded, this distinction being derived from the results obtained employing catalysts comprising molybdenum oxide on each of these materials. Thus according to my invention alumina would be considered to be a carrier for hydroforming, whereas clay would not be so considered.

Discussion of each type of catalyst in turn is too extensive to be herein included, but in general it may be said that those materials which have heretofore been employed successfully as carriers for catalysts of any composition for any particular reaction are considered by me to be carriers for those particular reactions within the definition hereinbefore given. Those materials which have in past experience been demonstrated to be inferior as carriers for any particular reaction are considered to fall in the class of supporting materials when viewed in the light of any particular reaction. In this regard a material which is a carrier in one reaction may be classed as a support in another and is considered accordingly in the usages of my invention. For example, whereas aluminum silicate is an effective carrier for a cracking catalyst it is considerably inferior to alumina as a carrier for a hydroforming catalyst and the converse is also true; that is, alumina which is an effective carrier for a hydroforming catalyst does not have the required qualities to be as an effective carrier for a cracking catalyst and thus with regards to the hydroforming reaction and a catalyst to be employed therein alumina would be classed as a carrier and aluminum silicate as a support, and in a cracking reaction in a catalyst to be employed therein aluminum silicate would be classed as a carrier and alumina as a support.

My invention contemplates the substitution of a major part of the carriers previously employed in many catalysts with a support which is preferably considerably less expensive than the carrier material. On the grounds of availability and relative costs such materials as clay, bauxite, silica, impure synthetic aluminas, aluminas, kieselguhr, and similar materials are preferred as the supports according to this invention, although it is within the scope of my invention to employ any desirable material to replace a major proportion of the carrier in any catalyst. The classification of clay includes the various types of clays such as the montmorillonite, kaolinite, China clay, ball clay and the like and as is the case with the other supports mentioned may be in any stage of refinement depending upon the usage desired. There are many ways by which minor proportions of a carrier material may be incorporated on such supports. For the sake of clarity these various methods are described in relation to the preparation of a hydroforming catalyst comprising aluminum oxide, molybdenum oxide, and such support material. In the preparation of this catalyst a support such as for example bauxite may be impregnated with a minor proportion of aluminum oxide as the carrier by the classical method of impregnation involving the immersion of the bauxite in a solution of a suitable aluminum salt such as aluminum nitrate, aluminum chloride, and the like with subsequent drying and calcination to convert the adsorbed or occluded aluminum salt into aluminum oxide.

Other methods of incorporation of the carrier on the support and in this example of the alumina on the bauxite may be employed involving the precipitation of the carrier in the presence of or on the surface of the support. Thus in a method analogous to that described above, the bauxite may be added to an aluminum salt solution and the alumina therein may be subsequently precipitated. This precipitation may be accomplished by either an acidic or a basic reagent depending upon the nature of the aluminum salt employed. Thus if sodium aluminate is used to furnish the alumina to the bauxite acidification will effect the precipitation of the aluminum hydroxide and if aluminum nitrate is employed an increase in pH brought about by means of suitable base such as ammonium hydroxide will effect the precipitation of the aluminum oxide. This method is most satisfactorily employed by immersing the support in a solution of a salt of the carrier metal, separating the support from the solution and treating the wet material with the desired agent to precipitate the carrier oxide on the surface of the supporting material.

In certain cases it may be desirable to effect the coprecipitation of the carrier and the support by inclusion of soluble salts of the two in a solution with subsequent precipitation by addition thereto of a suitable reagent.

In any or all of these methods of preparation it may be necessary to wash the support-carrier combination to remove undesirable impurities therefrom such as contaminating ions resulting from the impregnating or precipitating solutions employed. This washing may be accomplished either before or after drying with hot or cold water with acid or base or other materials as the situation requires dependent upon the circumstances of each individual preparation.

Other methods of distending the carrier on the supporting material may be used without departing from the principles of my invention. For example if the desired carrier is a sublimable metal oxide such as vanadium oxide, chromium oxide or the like, a simple method of preparing the support-carrier base involves only the sublimation of the metal oxide carrier onto the support. This may be effected in any desired manner such as commingling the two materials and heating to a temperature sufficiently high to effect the sublimation of the carrier material with subsequent deposition on the support which sublimation may be carried out either prior to or after forming the commingled support and carrier. In this regard if a porous support is employed on which is to be distended the carrier material the support and carrier may be commingled during sublimation for it has been shown that a layer of a sublimable metal oxide may be deposited on a porous support in this manner. On the other hand if a non-porous material is used as the support better results are obtained if the vapors of the sublimed carrier are contacted with the support at a comparatively lower temperature to effect their condensation thereon. Many variations in this procedure are possible.

After preparation of this base comprising a support upon which is deposited a minor proportion of a carrier the catalyst may be prepared in any desired manner by the incorporation on this base of a suitable catalytic agent. Thus, in the present example the base may be immersed in a suitable soluble salt solution of molybdenum such as ammonium molybdate or the like to adsorb ammonium molybdate from the solution. The base thus impregnated is subsequently dried and calcined to convert the ammonium molybdate to molybdenum trioxide. Many modifications of this method of adding catalytic agents may be employed such as for example the precipitation of the catalytic agent on the completed base by methods common in the art, or by precipitation of the catalytic agent together with the carrier material thereby depositing the two in coprecipitated form on the support, or by coprecipitation of the three constituents of the catalysts; that is, the support, the carrier and the catalytic agent. Again the process of sublimation may be employed, in this case to sublime the catalytic agent onto the support-carrier base. Further if the carrier and catalytic agent are both sublimable they may be deposited simultaneously on the support by this method. Although any of these methods may be employed, I prefer to prepare the finished base, comprising the support upon which has been distended the carrier material, and subsequently adding thereto the desired catalytic agent in any desired manner.

It is to be understood that it is within the scope of my invention to employ these methods of preparation as above described and modifications thereof which may occur to those skilled in the art for any catalyst comprising a support, a carrier and a catalytic agent which catalyst composition constitutes the essence of my invention. As pointed out above no generalization can be made as to the carrier which may be employed as a material which is classified as a carrier in one case may not be so classified in another, but such materials as alumina, silica, magnesia, zirconia, titania, thoria, beryllia, chromia and the like may be employed according to my invention. Many of these materials have not been heretofore employed to any large extent as catalyst carriers because of the quantities required for such usage. However, by means of my invention a new field of catalyst preparation is opened wherein heretofore economically impractical material may be employed as carriers because of the minor amounts required. Likewise, the catalytic agents to be employed are a function of the particular catalytic reaction in which they are to be used. Such compounds as the oxides or other compounds of the metals such as chromium, molybdenum, cobalt, nickel, zinc, iron, lead, cadmium, vanadium, manganese, tantalum, tungsten, titanium, platinum, columbium, scandium, thorium, uranium, zirconium, tin, copper, etc. have been employed and may be employed as catalytic agents for various catalytic processes. Of the above metals titanium, zirconium, and thorium are metals of the left-hand column of group IV of the periodic system; vanadium, columbium, and tantalum are the three metals of the left-hand column of group V; chromium, molybdenum, tungsten and uranium are the metals of the left-hand column of group VI; manganese is a metal of the left-hand column of group VII; and iron, cobalt, nickel, and platinum are metals of group VIII. Various combinations of these materials may also be effective catalytic agents such as for example the combined oxides of cobalt and molybdenum as employed in desulfurization catalysts.

In this manner I have prepared catalysts for high temperature hydrocarbon conversion processes such as dehydrogenation, desulfurization, hydrogenation, hydroforming, cracking and the like, which conversion processes are operated at temperatures in the range of about 500° F. to about 1500° F. and which processes employ catalysts of the type comprising a support-carrier base as described and a compound of one or more of the metals hereinbefore listed and preferably one or more of the oxides of the metals of group V, VI, and VIII of the periodic table. These processes are operated at high temperatures in the range of 500° F. to 1500° F. and preferably in the range of 650° F. to 1200° F. and at pressures in the range of −14 pounds per square inch to as high as 1,000 pounds per square inch.

Thus in the process known as hydroforming, I may employ a catalyst comprising about 8 to 12 weight per cent of molybdenum oxide as the catalytic agent and about 5% or more of aluminum oxide as the carrier distended on a suitable porous support such as bauxite, clay, silica, and the like. The preferred catalyst for this process comprises about 8 to 12 weight per cent of molybdenum oxide, about 5 to about 15 weight per cent aluminum oxide and about 73 to 87 weight per cent of bauxite prepared by impregnating the bauxite with an aluminum salt, drying and calcining this base material to convert the aluminum salt to aluminum oxide and subsequently distending thereon the desired amount of molybdenum oxide by the process of impregnation, drying and calcination. This catalyst may be employed in a hydroforming reaction in which a selected hydrocarbon feed is subjected to the action of the catalyst at temperatures in the range of about 700° F. to about 1200° F. and preferably about 850° F. to about 1050° F. and at pressures of about 100 to about 500 pounds per square inch or higher in the presence of a hydrogen rich recycle gas whereby a substantial portion of said hydrocarbon feed is converted to aromatic hydrocarbons. Whereas, catalysts comprising from 8% to 12% molybdenum oxide are the preferred catalysts for this operation, I have found that catalysts containing as low as 5% by weight and as high as 15% by weight of molybdenum oxide were good catalysts.

Also in a hydrocarbon conversion process known as desulfurization I may employ a catalyst comprising from about 2 to about 40 weight per cent and preferably about 3 to about 20 weight per cent of the combined oxides of cobalt and molybdenum and a corresponding amount such as from about 2 to about 40 weight per cent of alumina as the carrier for the combined oxides of cobalt and molybdenum and from about 20% to about 96% of a porous support such as bauxite, silica, montmorillonite clay, or the like prepared by the method of this invention for reducing the sulfur content of petroleum fractions or even crude oil. The desulfurization is carried out by passing the desired petroleum stock over the catalyst at temperatures ranging from as low as 500° F. to as high as about 1,000° F. but preferably in the range of about 600° F. to about 900° F. and at pressures in the range of a few atmospheres to about 1,000 pounds per square inch in the presence of a hydrogen rich recycle gas.

Further in the process of dehydrogenation I may employ a catalyst comprising from about 1 to about 20 weight per cent and preferably about 5 to about 15 weight per cent of chromium oxide and a similar amount of alumina, that is from about 1 to about 20 weight per cent of alumina and from about 60 to about 98 weight per cent of porous support which catalyst is prepared by the process of my invention. The dehydrogenation of the normally gaseous hydrocarbons may be carried out at temperatures in the range of about 900° F. to about 1,500° F. and preferably in the range of about 1,000° F. to about 1,200° F. at pressures in the range of −14 pounds per square inch to atmospheric or above.

It is to be understood that the principles of this invention may be employed for the preparation of a wide variety of catalysts of the heterogeneous type which involve the use of a carrier type material and they are not limited to those described inasmuch as a complete description cannot be included herein. My invention consists of the discovery that a large proportion of the carrier type material employed in such catalysts, which in many cases is quite costly and in other cases prohibitive, may be substituted by a comparatively inexpensive inert support. It is apparent from the foregoing description and the following examples of the principles of this substitution that its range of utilization is a function only of the range of catalysts of this nature. Further, I have found that it is not necessary for this supporting material to be highly adsorptive although such adsorptive properties are desirable, inasmuch as all that is necessary in such material is that it be possible to deposit thereon a coating of a carrier suitable to the particular catalyst to be prepared upon which may be distended the desired catalytic agent or agents as hereinbefore disclosed. Thus I may use such materials as corundum or other refractories having very low adsorptive properties. Further than this I have found that various fused metal oxides if employed in a sufficient state of subdivision subsequently coated with the desired carrier and catalytic agent may be employed as catalysts in such state of subdivision or may be formed by pilling, extrusion or otherwise into any desired shape. Thus the fused oxides of aluminum, silicon, zirconium, titanium, thorium, beryllium, and the like, if available in a fine state of subdivision such as for example 200 mesh or below may be employed. In this regard I have prepared an effective catalyst by coating silica dust of a particle size of less than 1 micron with a minor percentage of alumina and subsequently with a catalytic agent which is effective in various hydrocarbon conversion processes dependent upon the catalytic agent distended thereon.

Inasmuch as the present usage of such carrier materials as described involves quantities of such materials ranging as high as 95% or more of the completed catalyst it is not intended by my invention to limit the usage of such carrier materials when impregnating an inert or comparatively inert support as described to values below this range. However, I have found that effective catalysts may be prepared by employing as little as 10% of these carrier materials distended upon the desired supports and therefore it is within the scope of this invention to employ these carrier materials in amounts ranging from low values of 5% to 10% to values approaching those in such catalysts in the absence of the supporting material.

Perhaps the major advantage of catalyst preparation in this manner resides in the economics thereof and has been discussed previously. However, catalysts prepared according to the method herein described appear to exhibit increased activity and increased heat stability in many cases. This increased activity may be due to a more effective distribution of the catalytic agent on the carrier when the catalyst is prepared according to the method as herein disclosed. Further than this certain carriers although apparently necessary to a completed catalyst exhibit certain detrimental effects when present in the quantities heretofore employed in catalyst preparation. Thus alumina or alumina-silica mixtures which are generally employed as carriers for hydroforming catalysts appear to exhibit a tendency as might be expected to catalyze the rupture of carbon to carbon bonds which is undesirable in such reaction. As shown in the following examples this tendency may be considerably reduced in the catalyst prepared according to my invention by the choice of a suitable supporting material. This reduction, in the absence of similar properties in the supporting material, follows as the quantity of carrier employed is reduced.

Another important feature of my invention resides in the ability, through utilization of the principles herein set forth, to employ certain spent catalysts and particularly isomerization catalysts to prepare active catalysts for other reactions. A great many isomerization catalysts are comprised of aluminum chloride distended on some relatively inexpensive support such as impure bauxite or the like. In usage the aluminum chloride content of the catalyst is reduced by sublimation to a point where the catalyst is no longer effective. I have been able to utilize this waste catalyst in making active catalysts for various hydrocarbon conversion reactions such as hydroforming desulfurization and the like by converting the residual aluminum chloride on the surface of the supporting material to aluminum oxide to function as such as a carrier for a catalytic agent. This therefore is another application of the principle of impregnating a support material with a carrier to furnish a base for a catalyst and merely takes advantage of the presence of an aluminum salt on such a support in a previously prepared catalyst.

Examples of the application of my invention will serve to clarify the principles thereof and to illustrate the advantages accruing from the ability to substitute an inexpensive supporting material for a major proportion of the more valuable carrier materials.

Example I

A hydroforming catalyst hereinafter designated as Catalyst No. 1 comprising approximately 10% by weight of molybdenum trioxide, approximately 10% by weight of aluminum oxide and approximately 80% of partially refined bauxite was prepared as follows: 650 parts by weight of the fresh bauxite previously calcined for two hours at 600° C. was immersed for thirty-eight minutes in 500 parts of two molar solution of aluminum nitrate. After this immersion the particles of impregnated bauxite were drained, dried at 110° C. and calcined for two hours at 600° C. to convert the aluminum nitrate distended thereon to aluminum oxide. 250 parts by weight of these bauxite-alumina 8 to 20 mesh particles were subsequently immersed for 15 minutes in an ammonium molybdate solution containing ammonium molybdate in an amount equivalent to 21.6% by weight of molybdenum trioxide in the impregnating solution. After the 15 minute soaking time the granules were drained, dried at 110° C. and calcined at 600° C. for two hours to convert the adsorbed ammonium molybdate to molybdenum trioxide.

Another catalyst hereinafter designated as Catalyst No. 2 was prepared by immersing a sample of the same bauxite used in Catalyst No. 1 after calcination for two hours at 600° C., directly in a portion of the ammonium molybdate solution, drained, dried at 110° C. and calcined for two hours at 600° C. to give a catalyst comprising approximately 10% by weight of molybdenum trioxide and 90% by weight of bauxite.

A third catalyst designated as Catalyst No. 3 was prepared in the same manner as Catalyst No. 2 employing a gel type alumina as the support for the molybdenum trioxide. This catalyst had a final composition of approximately 10% by weight of molybdenum hydroxide and 90% alumina.

These three catalysts were tested for hydroforming activity by passing a feed comprising a 200° F. to 260° F. naphtha fraction over each catalyst at 950° F. isothermal block temperature, 100 pounds per square inch gage pressure, with a liquid hourly space velocity of 1.0 and with 3,000 cubic feet of added hydrogen per barrel of feed. The aromatic synthesis reported in Table I below was taken as the measure of the hydroforming activity of the catalysts.

Table I

| Catalyst No. | 1 | 2 | 3 |
| --- | --- | --- | --- |
| Liquid Yield, Vol. Percent | 72 | 78.7 | 64.7 |
| Gravity, °A. P. I. at 60° F | 42.4 | 45.5 | 41.0 |
| Percent Aromatics in Product | 70.2 | 58.0 | 75.8 |
| Aromatic Synthesis | 37.5 | 31.3 | 34.8 |

These data not only illustrate the improvement resulting by coating an inferior support with an active carrier as shown by comparison of Catalysts Nos. 1 and 2 but further the reduction of cracking brought about by the use of only a small percentage of the alumina carrier in Catalyst No. 1 as compared to Catalyst No. 3 supported entirely on alumina. This reduction of cracking is evidenced by higher yield, somewhat lower aromatic content in the product but a higher aromatic synthesis.

Example II

For desulfurization catalysts comprising the combined oxides of cobalt and molybdenum on various bases were prepared by impregnation of these bases with a solution containing salts of cobalt and molybdenum. This impregnating solution was prepared as follows: 175.3 parts by weight of ammonium paramolybdate containing 82.2% of molybdenum trioxide was dissolved in 450 parts by weight of .9 specific gravity ammonium hydroxide and 300 parts of water. To this ammonium molybdate in ammoniacal solution was added 150 parts by weight of 3.43 molar cobalt nitrate solution. This solution was used to impregnate four different base materials by immersing granules of the respective materials for 15 minutes in a portion of the solution, draining the granules, drying at 110° C. and calcining for two hours at 600° C.

Catalyst No. 4 was prepared as above employing an activated gel type alumina base and comprised 9.7% by weight of the combined oxides of cobalt and molybdena and 90.3% by weight of alumina.

Catalyst No. 5 was prepared using the same bauxite as that employed in Catalyst No. 2 above and the final composition contained approximately 10.1% by weight of the combined oxides of cobalt and molybdenum and approximately 89.9% by weight of bauxite.

Catalyst No. 6 was prepared using a base comprising bauxite upon which had been distended approximately 10% by weight of alumina by impregnation with an aluminum nitrate solution as described above. This alumina-bauxite base was then impregnated with the combined oxides of cobalt and molybdenum to give a catalyst containing approximately 8.5% by weight of cobalt-molybdenum oxides, 9.5% by weight of alumina and 82% by weight of bauxite.

Catalyst No. 7 was prepared using spent isomerization catalyst as the base. The spent isomerization catalyst consisted of approximately 6.1% of residual aluminum chloride on bauxite and was adapted to usage for purposes of desulfurization catalyst preparation by water washing to convert the aluminum chloride to a hydrous aluminum oxide by hydrolysis. The water washed material was then dried and calcined to yield a finished base comprising approximately 5.3% by weight of synthetic alumina and 94.7% by weight of bauxite. The bauxite employed throughout these examples and in the isomerization catalyst are partially refined bauxites in which the iron content has been appreciably reduced. The synthetic alumina-bauxite base prepared from the spent isomerization catalyst was impregnated with the combined oxides of cobalt and molybdena by the standard method hereinbefore described to yield a catalyst comprising approximately 10.1% by weight of cobalt and molybdenum oxide, 5% by weight of alumina carrier and 84.9% by weight of the bauxite support.

Each of these catalysts were employed to desulfurize a heavy straight run gas oil with a boiling range of 395° F. to 650° F. and containing 2.28 weight per cent sulfur determined by the A. S. T. M. bomb method. A six hour run was employed with each catalyst with a liquid hourly space velocity of two, pressure of 150 pounds per square inch gage, 750° F. isothermal block temperature. and with an added 3,000 cubic feet of hydrogen per barrel of feed. It is realized that these conditions of operation are not optimum for gas oil desulfurization inasmuch as an increase in pressure or reduction in space velocity will affect a greater degree of sulfur removal but were arbitrarily chosen for standard test conditions. The results of these runs are tabulated in Table II below:

Table II

| Catalyst No. | 4 | 5 | 6 | 7 |
|---|---|---|---|---|
| CoO-MoO₃, wt. percent | 9.7 | 10.1 | 8.5 | 10.1 |
| S in product, wt. percent | .21 | .25 | .19 | .15 |

It is evident from these data that Catalysts Nos. 6 and 7 prepared on the alumina impregnated bauxite were considerably more effective than was Catalyst No. 5 prepared on the bauxite alone. Further than this these alumina-bauxite catalysts were superior to Catalyst No. 4 prepared on straight alumina. These differences are further magnified when other factors, not here considered, such as apparent bulk density, ratio of cobalt to molybdenum and the like are taken into account.

The difference between Catalysts Nos. 6 and 7 is interesting for it is thought to be a function of the type of alumina coating deposited on the catalyst. That is by various methods of effecting the impregnation of the supports as herein disclosed I am able to obtain different types of structure of the same carrier material distended thereon. Thus by hydrolysis of an anhydrous aluminum chloride on the bauxite I obtain a different alumina structure than by pyrolysis of adsorbed aluminum nitrate. No definite rules can be laid down for the type of coating desired inasmuch as it will vary depending upon the support, carrier and catalytic agent employed.

Having described and illustrated the principles of my invention which are essentially the substitution of a portion of a catalyst carrier by a relatively inexpensive support by impregnating the support with a quantity of the carrier material I do not wish to be limited thereby inasmuch as many modifications may occur to those skilled in the art without departing from the spirit and scope of the following claims.

I claim:

1. A process for the catalytic desulfurization of hydrocarbon which comprises subjecting such hydrocarbon to temperatures in the range of about 500° F. to about 1,000° F. at gage pressures in the range of about atmospheric to about 1,000 pounds per square inch in the presence of a catalyst consisting essentially of a major proportion of a base prepared by distending more than about 5% of alumina on bauxite and a minor proportion of the combined oxides of cobalt and molybdenum distended on said bauxite alumina base.

2. A process for the catalytic desulfurization of a petroleum hydrocarbon fraction which comprises subjecting said hydrocarbon fraction to a temperature between about 500° F. and about 1000° F. in the presence of added hydrogen and a catalyst comprising a major proportion of a catalyst base and a minor proportion of the combined oxides of cobalt and molybdenum distended thereon, said base comprising a major proportion of bauxite and a minor proportion greater than about 5% of alumina distended thereon; said catalyst having been prepared by impregnating said bauxite with an aqueous solution of an aluminum salt, drying and calcining the impregnated bauxite to form said catalyst base, and impregnating said base with said combined oxides of cobalt and molybdenum.

3. A process for the catalytic desulfurization of hydrocarbon which comprises subjecting such hydrocarbon to temperatures in the range of about 500° F. to about 1,000 F. in the presence of a catalyst consisting essentially of a major proportion of a base prepared by distending more than about 5% of alumina on bauxite and a minor proportion of the combined oxides of cobalt and molybdenum distended on said bauxite alumina base.

PAUL G. NAHIN.

REFERENCES CITED

The following references are of record in the file of this patent:

UNITED STATES PATENTS

| Number | Name | Date |
|---|---|---|
| 2,141,185 | Houdry | Dec. 27, 1938 |
| 2,270,090 | Thomas | Jan. 13, 1942 |
| 2,273,299 | Szayna | Feb. 17, 1942 |
| 2,296,406 | Spicer et al. | Sept. 22, 1942 |
| 2,304,168 | Heard | Dec. 8, 1942 |
| 2,313,117 | Becker | Mar. 9, 1943 |
| 2,325,034 | Byrns | July 27, 1943 |
| 2,330,685 | Connolly | Sept. 28, 1943 |
| 2,331,338 | Michael et al. | Oct. 12, 1943 |
| 2,355,388 | Michael et al. | Aug. 8, 1944 |
| 2,356,576 | Free et al. | Aug. 22, 1944 |
| 2,422,372 | Smith et al. | June 17, 1947 |

FOREIGN PATENTS

| Number | Country | Date |
|---|---|---|
| 502,961 | Great Britain | Mar. 27, 1939 |
| 504,614 | Great Britain | Apr. 24, 1939 |